June 4, 1929.  E. N. PERCY  1,716,084
GAS PRODUCER FOR MOTOR VEHICLES
Filed July 22, 1925
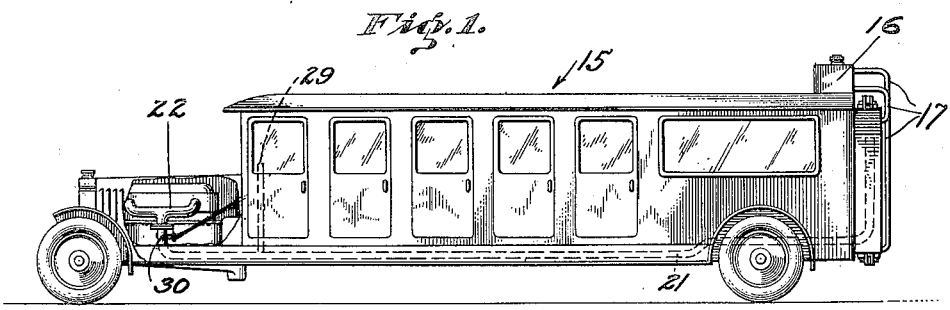
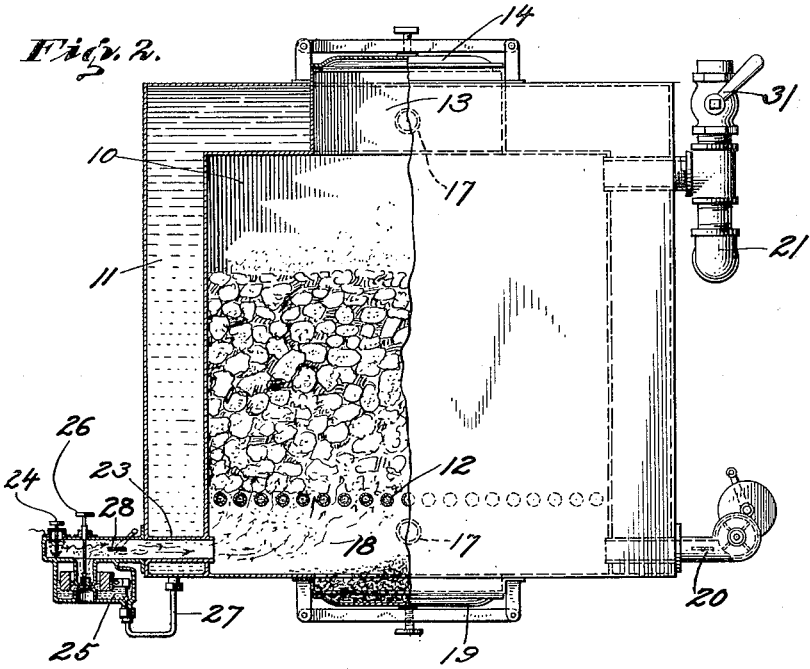
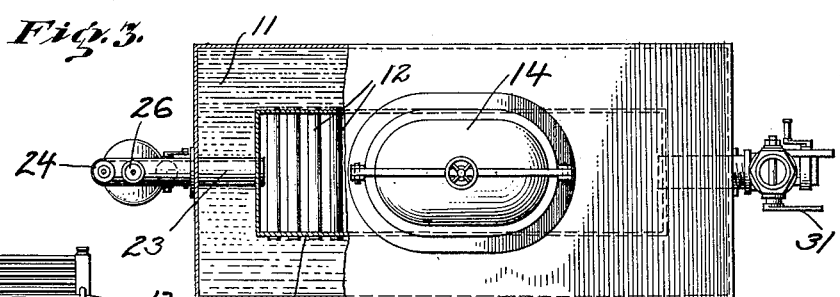
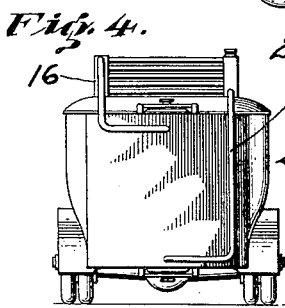
INVENTOR.
Earl Newman Percy
BY
Dewey, Strong, Townsend & Loftus
ATTORNEYS.

Patented June 4, 1929.

1,716,084

UNITED STATES PATENT OFFICE.

EARL NEWMAN PERCY, OF OAKLAND, CALIFORNIA.

GAS PRODUCER FOR MOTOR VEHICLES.

Application filed July 22, 1925. Serial No. 45,191.

This invention relates to a continuous production of gas from charcoal or coal-char and some forms of coke by a partial combustion with or without the admission of steam, and is especially designed for use with motor vehicles.

The primary object of my invention is to provide a cheaper fuel for motor vehicles, or at least one which is more available than liquid hydrocarbon.

I am aware that it has heretofore been proposed to apply a gas producer to a motor vehicle for the purpose of making gas from solid forms of fuel, which gas would be suitable for operating an internal combustion engine; but so far as I am aware, prior producers for this purpose have been subject to various defects, among which may be mentioned the following:

(a) Complications in the way of cleaning and cooling the gas;

(b) The use of refractory linings which add to the weight and are subject to early deterioration on account of the vibrations of the vehicle;

(c) Limitations of space, both as to grate area and capacity of the combustion chamber;

(d) Difficulties of cooling the grate bars and the walls of the combustion chamber;

(e) Disposal of the ash, and other difficulties of a more or less minor character.

In and by the present invention I have provided a gas producer especially adapted for use in connection with motor vehicles, and wherein the foregoing problems and difficulties are to a large extent overcome or reduced. Stated briefly, my invention comprehends the provision of a combustion chamber of a size and shape readily adapted to space available on a motor vehicle, especially a vehicle of the truck or bus type. This chamber is surrounded by a water jacket for cooling the walls, and the grate bars are made hollow and are also cooled by water from the surrounding jacket.

One form which my invention may assume is exemplified in the following description and illustrated in the accompanying drawing, in which Fig. 1 shows an elevation of the gas producer applied to the rear end of a motor bus;

Fig. 2 shows a side elevation, partly in section, of the gas producer;

Fig. 3 shows a plan view, partly in section, of the same;

Fig. 4 shows a rear end elevation of the complete assembly illustrated in Fig. 1.

Referring in detail to the accompanying drawing, the gas producer comprises a combustion chamber 10, cubical in form and surrounded by a water jacket 11. Hollow grate bars 12 are arranged near the bottom of the combustion chamber and are in communication with the water in the jacket 11, so as to be cooled thereby. The combustion chamber has a filling opening 13 at the top, closed by a cap 14. Through this opening the fuel, such as charcoal, is supplied to the combustion chamber, the capacity of the chamber being sufficient to supply gas to the engine for an ordinary day's run.

The combustion chamber and surrounding jacket form a flat-sided structure which in width and height approximates that of the rear end of the body of a bus or compartment of a motor vehicle 15. A water cooler 16 is preferably provided for cooling the water, and this water cooler may be placed on top of the vehicle body or in some other exposed position, so as to be affected by air currents. Water may be circulated by a pump or otherwise, and in the present instance I show connections 17 between the water cooler and jacket, whereby a thermo-siphonic action is produced.

Below the grate bars 12 is a space 18 for receiving the ash, and there is an opening in the bottom of the combustion chamber, closed by a door 19, whereby any ash may be removed. Leading into the combustion chamber below the grate bars is a blower 20 for the purpose of supplying a blast of air to assist in starting combustion of the fuel. The gas produced within the combustion chamber is taken off through a pipe 21 leading from the upper portion of the combustion chamber directly to the intake manifold 22 of the engine.

For supplying air and water to the combustion chamber during the normal operation of the device. I provide a pipe 23 having a spring-loaded inlet valve 24 through which air is admitted. This pipe communicates with a float chamber 25 through an orifice controlled by a needle valve 26, being in general similar to a carburetor. The float chamber is supplied with water from the water jacket through a pipe connection 27. Thus under the suction of the engine, air is drawn through the pipe 23 and a regulated amount of water introduced therewith, so as to increase the calorific value of the gas by the reaction between the fuel carbon and steam. The pipe 23 may if desired be provided with a throttle valve 28 suitably controlled so that the air and hot water admitted through the pipe may be regulated as desired. Also an auxiliary air supply may be provided through a pipe 29 connected with the pipe 21 and arranged with a valve conveniently placed to the driver, whereby the gas may be diluted before it reaches the engine. The engine will have the usual throttle valve indicated at 30.

At the commencement of gas making operations, the combustion chamber is partially filled with a charcoal or other solid fuel and this charcoal is then ignited adjacent the grate bars. The blower 20 is then operated to supply a blast of air for bringing the fuel to incandescence. I provide a stack valve 31 leading from the top of the combustion chamber, whereby the products of initial combustion may be carried off and a draft afforded for blasting the fuel. When the fuel has been heated to the gas-making stage the entire combustion chamber should be filled with fuel, and the device is then ready for normal operation.

When the engine is operating the valve 31 is closed and the suction from the engine draws off the gas. The gas may if desired be passed through a suitable scrubber before reaching the engine. Air and water are admitted through the pipe 23 in regulated amounts, varying, of course, with the demands of the engine.

Once the apparatus is placed in operation it is not necessary to rekindle the fuel, inasmuch as the charcoal will remain at incandescence during a considerable period of time. When the vehicle is at rest for several hours the valve 31 should be opened, so as to permit the gas to pass off into the atmosphere and avoid building up of any high pressure in the system, as well as to supply a draft to insure that the fuel may be kept at incandescence.

It will be noted that the device is located directly on the chassis of the vehicle and is without springs or cushions other than the vehicle springs. Thus the mounting of the apparatus is considerably simplified, and the vibrations incident to the operation of the vehicle may be depended upon to shake the fuel down onto the grate bars and to deposit the ash into the ash pit. The flat shape of the device readily adapts it to the space available on commercial vehicles, and allows sufficient storage space for fuel to supply the normal requirements of an engine over a period of several hours without replenishing the fuel. The cooling of the combustion chamber and the grate bars by the circulation of water around and through the same insures that the exterior walls will not become overheated and that the grate bars will not burn out, while at the same time they may be made relatively light and of sufficient area to make the proper amount of gas.

Various changes in the construction and arrangement of the several parts of the apparatus herein shown and described may be employed without departing from the spirit of my invention as disclosed in the appended claims.

What I claim as new and desire to secure by Letters Patent is:

1. In a power plant for motor buses of the gas engine type, the combination of a gas engine, adapted to drive the bus, a gas producer mounted upon the bus body for supplying gas for said engine, said gas producer comprising a metallic casing having a combustion chamber, hollow grate bars in said combustion chamber to support gas producing fuel, communicating means extending from the combustion chamber of said gas producer to the intake of the engine, and an air cooled water cooler in communication with said hollow grate bars adapted to maintain a thermo-siphon circulation of cooling water therethrough, said water cooler being mounted above said combustion chamber and exposed to a free circulation of air as said bus moves whereby the cooling action thereof will be proportional to the rate of gas production as determined by the speed of the driving engine.

2. In a power plant for motor buses of the gas engine type, the combination of a gas engine for driving the bus, a gas producer mounted upon the bus body for supplying gas for said engine, said gas producer comprising a combustion chamber having metallic walls, a water jacket surrounding said combustion chamber for cooling the same, communicating means extending from the combustion chamber of said producer to the intake of the engine, and an air cooled water cooler connected in communication with said water jacket and adapted to maintain a thermo-siphon circulation of cooling water through said water jacket and prevent an excessive waste of water through evaporation, said water cooler being mounted in an exposed position upon said bus so that a circulation of air will pass therethrough proportional to the rate of gas production as determined by the speed of the engine and bus.

3. In a power plant for self-propelled motor vehicles, the combination of a gas engine for supplying motive power to said vehicle, a gas producer for generating and supplying gas for said engine, said gas producer comprising a metallic casing adapted to be secured against the body of the vehicle and having a combustion chamber therein, a water jacket within said casing surrounding said combustion chamber to prevent overheating of said casing, hollow open ended grate bars extending across said combustion chamber to support gas-producing fuel and communicating at their open ends with said water jacket, communicating means extending from the combustion chamber of the gas producer to the intake of the engine whereby the rate of gas production will be determined by the speed of the engine, and an air cooled water cooler in communication with said water jacket adapted to maintain a thermo-siphon circulation of cooling water therethrough and through said hollow grate bars, said water cooler being mounted upon the vehicle body above said combustion chamber and exposed to a free circulation of air as said motor vehicle is driven by said engine whereby the cooling action thereof will be proportional to the amount of cooling air passing therethrough as determined by the speed of the vehicle.

4. In a power plant for motor vehicles of the self-propelled type, the combination of a gas engine for propelling the vehicle, a gas producer adapted to supply gas to said engine, said producer comprising a metallic casing adapted to be mounted in contact with the vehicle body and having a combustion chamber therein, a water jacket surrounding said combustion chamber to prevent overheating of said casing, hollow grate bars in the bottom of the combustion chamber communicating at their ends with the interior of said water jacket, a conduit connecting the interior of said gas producer with the intake of the engine whereby the rate of gas production will be determined by the speed of the engine, and a water cooler mounted upon the vehicle and disposed above the combustion chamber having connections communicating with said water jacket whereby a thermo-siphon circulation of cooling water will be continuously maintained through said water jacket and grate bars when said gas producer is in operation, said water cooler being exposed to a free circulation of air as said vehicle is driven by said engine whereby the cooling action thereof will vary with the rate of gas production as determined by the speed of the vehicle.

EARL NEWMAN PERCY.